(12) United States Patent
Huet et al.

(10) Patent No.: US 8,346,799 B1
(45) Date of Patent: Jan. 1, 2013

(54) RECENT CONTENT RANK ADJUSTMENT WITH INVERTED DECAY

(75) Inventors: François Huet, Palo Alto, CA (US);
Anil A. Sewani, Palo Alto, CA (US);
Daniel E. Rose, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 105 days.

(21) Appl. No.: 12/766,415

(22) Filed: Apr. 23, 2010

(51) Int. Cl.
*G06F 7/00* (2006.01)
*G06F 17/30* (2006.01)

(52) U.S. Cl. ...................................................... 707/770

(58) Field of Classification Search .......... 707/706–710, 707/718–723, 726–737, 748–775, 999.001–999.01, 707/999.1, 999.101–999.107, 999.2–999.206
See application file for complete search history.

(56) References Cited

U.S. PATENT DOCUMENTS

| | | | | |
|---|---|---|---|---|
| 2007/0087756 A1* | 4/2007 | Hoffberg | ...................... | 455/450 |
| 2010/0010987 A1* | 1/2010 | Smyth et al. | ...................... | 707/5 |
| 2010/0262454 A1* | 10/2010 | Sommer et al. | ................. | 705/10 |
| 2011/0035379 A1* | 2/2011 | Chen et al. | ..................... | 707/740 |

OTHER PUBLICATIONS

U.S. Appl. No. 12/045,470, filed Mar. 10, 2008, for Anil A. Sewani et al.

* cited by examiner

*Primary Examiner* — Khanh Pham
*Assistant Examiner* — Reza Hosseini
(74) *Attorney, Agent, or Firm* — Novak Druce + Quigg LLP (57) ABSTRACT

A search facility may optimize search result ranking by applying inverted decay transformations to history-dependent ranking components. Ranking scores for content in a content collection may be based on a set of ranking components including history-dependent ranking components. History-dependent ranking components may be based on historical behavioral data such as historical searches, actions taken with respect to content such as viewing content and content-related purchases. Content recently added to the content collection may be disadvantaged relative to content with an established history. Inverted decay transformations may correspond to simulations of additional historical behavioral data.

25 Claims, 6 Drawing Sheets

RECENT CONTENT RANK ADJUSTMENT WITH INVERTED DECAY

BACKGROUND

It has become commonplace to use computer systems to search large collections of content. For example, a user may submit a search request to a search facility and, in response, receive a search result set corresponding to related content in a content collection. Such search result sets can be relatively large, and the user may review only a portion of the search result set. If the content most relevant to the search request is not discoverable by the user, the user can become frustrated and even abandon the search. In a commercial context, such frustration can have significant financial consequences for the service provider. One technique that attempts to minimize the user's frustration is to display the higher ranked search results first so that the search results of interest are likely to be discovered by the user.

It is not uncommon for search result ranking to take into account historical behavioral data with respect to corresponding content. For example, historical behavioral data may include previous searches for the content and actions taken with respect to content such as accessing the content and engaging in transactions (e.g., financial transactions) with respect to content. Ranking techniques that account for historical behavioral data (e.g., that use history-dependent ranking components) can be sophisticated. For example, the behavioral data may be decayed so that more recent behavioral data is weighted more heavily than older behavioral data. Various data filtering and windowing techniques, such as moving averages, may also be employed. Content recently added to the content collection ("recent content") may be disadvantaged with respect to search result rank relative to content already existing in the content collection ("established content"). For example, some conventional search facilities determine search result rankings based in part on a decayed moving average of sales. In this example, recent content associated with a same rate of sales as established content can rank lower in the search results relative to the established content even though the user may be just as interested in the recent content. As a further example, some conventional search facilities determine search result rankings based in part on decayed counts of clicks of links to content presented in previous search results ("click-throughs"). In this further example, recent content may be disadvantaged (e.g., rank lower) because it has had less of a chance to accumulate click-throughs.

Some conventional search facilities attempt to compensate for the recent content disadvantage with respect to historical behavioral data by "seeding" some history-dependent ranking component values. For example, a search facility administrator may manually estimate what the history-dependent ranking component value will be once the recent content becomes established. However, manually estimating such ranking component seed values can be labor intensive, subjective and/or inaccurate. Some conventional search facilities attempt to address these issues by using content category averages as ranking component seed values. However, this ranking component seed value estimation can be inaccurate and/or unsatisfactory. Rank and/or ranking component value overestimation can be as detrimental to the user search experience as underestimation. Furthermore, the response of ranking component values over time to seed values can be unsatisfactory, and even unsuitable.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The technology described herein utilizes one or more inverted decay transformations to history-dependent ranking component values associated with recent content in order to rank recent content along with established content in a search result set. Search requests in accordance with at least one embodiment may include one or more search terms such as keywords. However, each embodiment is not so limited. For example, search requests in accordance with at least one embodiment include non-keyword search constraints. A search facility may rank a search result set in accordance with a set of ranking scores for corresponding content. A ranking score may be determined based on a set of ranking components. In at least one embodiment, at least some of the set of ranking components are history-dependent ranking components, that is, are ranking components based at least in part on historical behavioral data associated with content in the content collection.

History-dependent ranking component values for recent content may be non-optimal because of a limited amount of behavioral data history associated with recent content. In at least one embodiment, applying an inverted decay transformation to a history-dependent ranking component corresponds to making recent content event history comparable with established content event histories. For example, applying the inverted decay transformation to the history-dependent ranking component may correspond to simulating an extended behavioral data history. The inverted decay transformation may correspond to an extrapolation of existing, limited behavioral data history of recent content to simulate a behavioral data history that may be compared to behavioral data histories that are associated with established content ("comparable behavioral data history"). In at least one embodiment, the extrapolation depends on how the ranking component is determined. For example, simulating a comparable sales history for the decayed moving average of sales ranking component may correspond to suitably decaying simulated sales counts that are based on existing sales counts.

In at least one embodiment, simulated and/or comparable behavioral data history need not be created, nevertheless one or more inverted decay transformations may be configured so as to adjust corresponding ranking component values as if the simulated and/or comparable behavioral data history were present. In at least one embodiment, a behavioral data history length threshold (the "establishment threshold") may be identified at which recent content becomes established content, and inverted decay transformations for ranking components may be configured to have little or no effect once the length of associated behavioral data histories reaches the establishment threshold. However, each embodiment is not so limited. For example, inverted decay transformations for ranking components may be configured to have a decreasing effect as the length of associated behavioral data histories increases, without reference to a threshold. Where an inverted decay transformation corresponds to scaling by an inverted decay factor, the inverted decay factor may tend to unity as the length of associated behavioral data histories increase.

Figure 1:
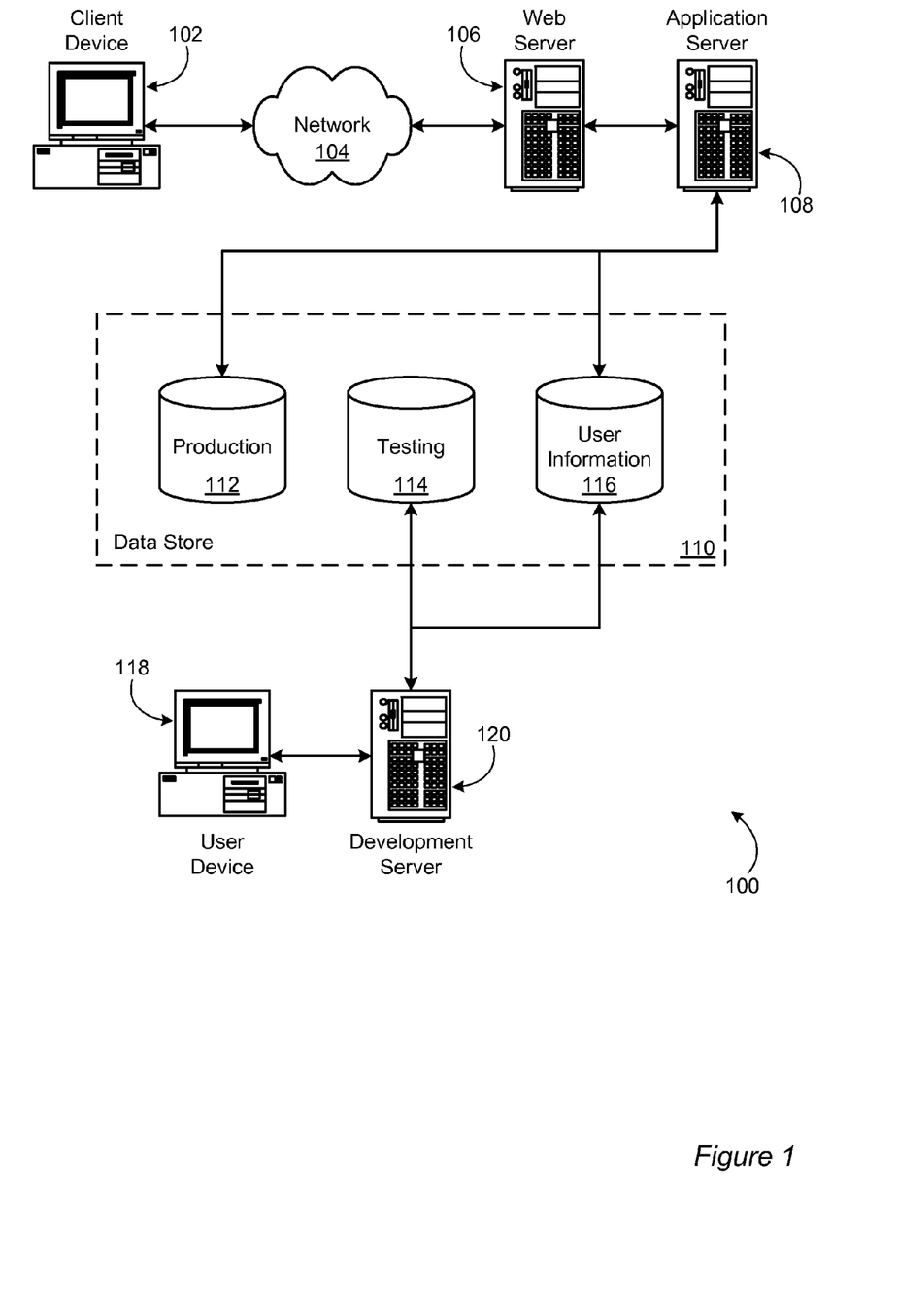
FIG. 1 is a schematic diagram illustrating an example environment for implementing aspects in accordance with at least one embodiment.

Various approaches may be implemented in various environments for various applications. For example, FIG. 1 illustrates an example of an environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
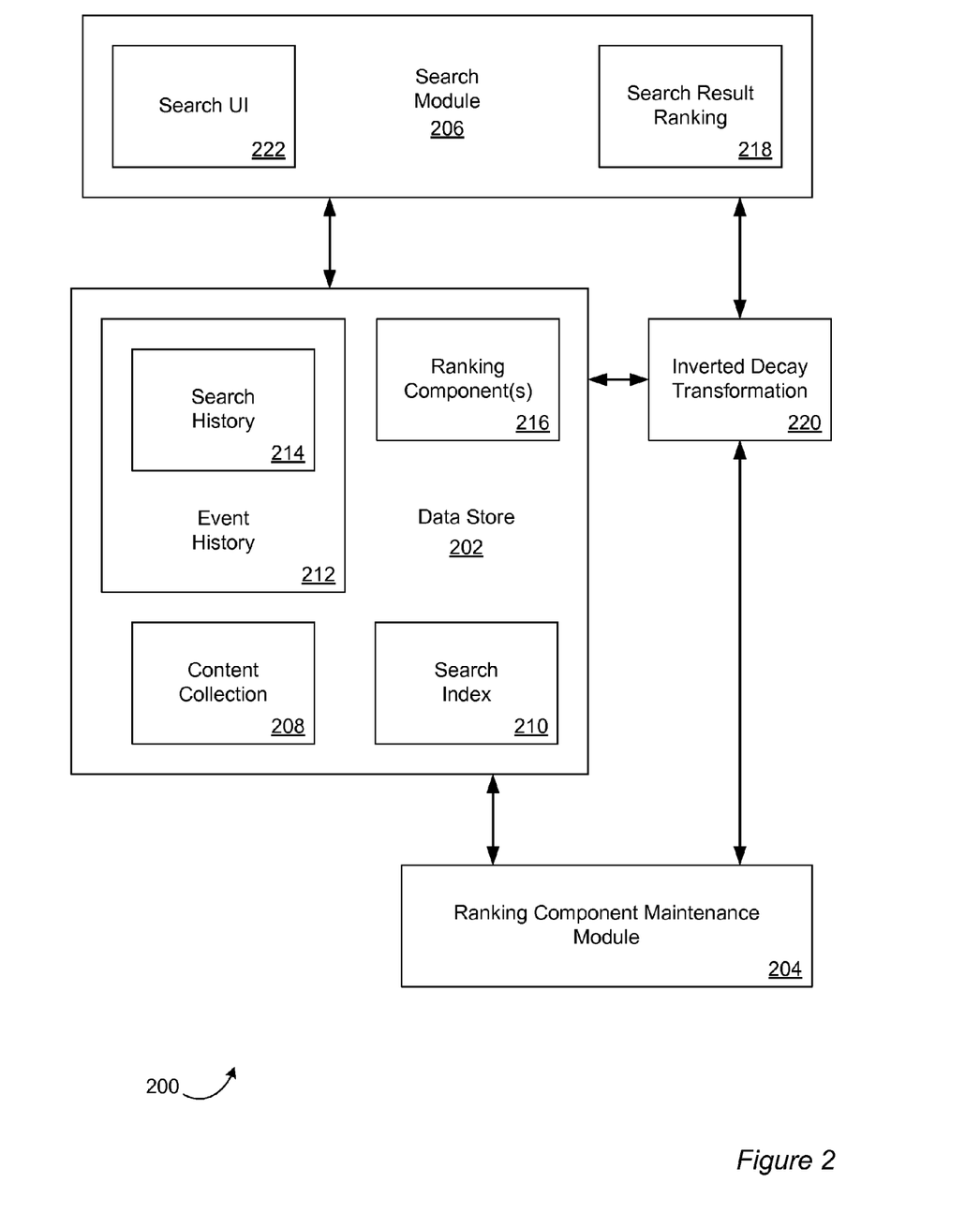
FIG. 2 is a schematic diagram depicting aspects of an example computerized system in accordance with at least one embodiment.

FIG. 2 depicts aspects of an example computerized system 200 configured to facilitate search in accordance with at least one embodiment. The system 200 may include a data store 202, a ranking component maintenance module 204, a search module 206, and an inverted decay transformation module 220. The data store 202 may include a content collection 208, a search index 210 utilized by the search module 206 to search the content collection 208, an event history 212 in which events associated with content in the content collection 208 may be recorded including a search history 214 in which searches of the content collection 208 may be recorded, and one or more ranking components 216 including one or more history-dependent ranking components based at least in part on the event history 212. The search module 206 may include a search result ranking module 218 configured to rank search result sets in accordance with a ranking scheme. The inverted decay transformation module 220 may be configured to adjust ranking scores for recent content so as to make them comparable to ranking scores determined for established content.

Ranking components on which ranking scores are based may be determined by procedures of varying computational complexity. For example, some ranking components may be obtained with a single request sent to the data store 202, while determination of other ranking components may involve an analysis of the event history 212 having a relatively high computational expense. Accordingly, determination of some ranking components (e.g., some of the ranking components 216) may be relegated to "back-end", offline, batch and/or periodic processes, and/or to a ranking component "build" phase facilitated by the ranking component maintenance module 204. Alternatively, or in addition, determination of some ranking components may be performed "live" and/or immediately in response to search requests received by the search module 206. The search result ranking module 218 may determine ranking scores for content in the content collection 208 based on a set of ranking components including the ranking component(s) 216. For example, a ranking score may be a linear combination of one or more of the set of ranking components. Alternatively, the ranking score may be a non-linear combination of one or more of the set of ranking components.

The search module 206 may further include a search user interface (UI) module 222 capable of facilitating user interaction with the system 200. The arrows between the modules 202, 204, 206, 220 in FIG. 2 indicate that the modules 202, 204, 206, 220 are communicatively coupled, for example, by a communication network within a computer and/or between a plurality of computers such as the servers 106, 108, 120 of FIG. 1. For example, the search module 206 may be hosted and/or implemented at least in part by the application server 108, the data store 202 may incorporate and/or be incorporated at least in part by the data store 110, the ranking component maintenance module 204 may be hosted and/or implemented at least in part by the development server 120, and the inverted decay transformation module 220 may be hosted and/or implemented at least in part by the application server 108 and/or the development server 120.

The content collection 208 may include any suitable content. Examples of suitable content include electronic records, data structures, data objects, documents, document collections, representations including representations of goods such as physical goods and commercial goods and representations of services such as commercial services, as well as suitable combinations thereof. The search index 210 may index the content collection 208. The search index 210 may include one or more data structures collectively corresponding to a relevance matrix associating search terms (e.g., each row may correspond to a particular search term) with content in the content collection 208 (e.g., each column may correspond to particular content in the content collection 208). In at least one embodiment, each position in the matrix includes a relevance score quantifying the relevance of a search term with particular content. As will be apparent to one of skill in the art, a variety of conventional data structures may be utilized in this role, and further details of such data structures need not be described herein. The relevance matrix may be implemented and/or represented by any suitable such data structure. Relevance scores are an example of a ranking component.

The search UI module 222 may provide information from the search module 206 for presentation. For example, the search UI module 222 may generate a search user interface (UI) presentation specification and provide the specification to the client device 102 (FIG. 1) through the network 104. The search UI module 222 may specify the search UI presentation with any suitable presentation specification language including suitable hypertext markup languages (e.g., HTML) and suitable programming and/or scripting languages (e.g., JavaScript). The search UI module 222 may receive information responsive to the search UI presentation. For example, the search UI module 222 may receive search requests including one or more search terms from the client device 102. The search UI module 222 may process received requests and activate associated search module 206 functionality in response.

A search request may include a string of text (a "search string"). One example includes a string of characters in accordance with a Unicode standard such as "The Unicode Standard, Version 5.0 (5th Edition)," authored by The Unicode Consortium, and published by Addison-Wesley Professional on Nov. 19, 2006. The search module 206 may identify one or more keywords (e.g., words of a language, such as English, that are not noise and/or "stop" words) and/or search terms (e.g., sequences of one or more words such as keywords) in the search string. Alternatively, or in addition, the search request may include one or more search constraints such as date ranges and content categories, and the search module 206 may identify the search constraints. The search module 206 may utilize the search index 210 to identify content in the content collection 208 having a relatively high relevance score with respect to the identified search terms and/or search constraints. For example, the search module 206 may perform any suitable matrix operation and/or equivalent operation to lookup relevance scores for content in the content collection 208 indexed by search terms and/or as constrained by the search constraints. Alternatively, or in addition, the search module 206 may select a search result set corresponding to content in the content collection 208 responsive to the search request based on a search context. For example, the search context may include an address (e.g., an identifying, internet and/or web address) at which the system 200 resides, a search session context including identification of an authenticated user, user preferences, user information such as user demographics, and search history including sequences of search request-response exchanges.

The search module 206 may determine a search result set responsive to the search request. For example, the search result set may correspond to content in the content collection 208 having ranking scores above a ranking score threshold and/or ranked according to ranking score. Alternatively, or in addition, the search result set may correspond to content in the content collection 208 having adjusted ranking scores above a ranking score threshold and/or ranked according to adjusted ranking score. The search result set, or a reference thereto, may be provided to the search UI module 222, which may format the search result set for presentation.

Any suitable event associated with content in the content collection 208 may be recorded in the event history 212. Examples of suitable events include actions taken by users of the system 200 with respect to the content collection 208 such as interacting with the content collection 208, searching the content collection 208, interacting with content in the content collection 208, viewing content in the content collection 208, participating in a transaction with respect to content in the content collection 208, participating in a commercial transaction with respect to content in the content collection 208, purchasing content in the content collection 208, and purchasing goods or services represented by content in the content collection 208. Any suitable event details including event contexts may be recorded in the event history 212. Examples of suitable event details include time of occurrence (e.g., as indicated by a timestamp), event location, event participant identifications, at least references to associated content in the content collection 208, content interaction details where appropriate, and transaction details where appropriate.

Details of each search request handled by the search module 206 may be recorded in the search history 212. In particular, the search module 206 may record the search string, identified search terms and/or search constraints included in search requests along with any suitable metadata including, for example, a timestamp corresponding to a time and/or a date that the search request was received by the search module 206. In at least one embodiment, duplicate events, such as duplicate search requests, are not removed and/or filtered from the event history 212, and/or at least, duplicates are counted and/or otherwise suitably summarized.

Figure 3:
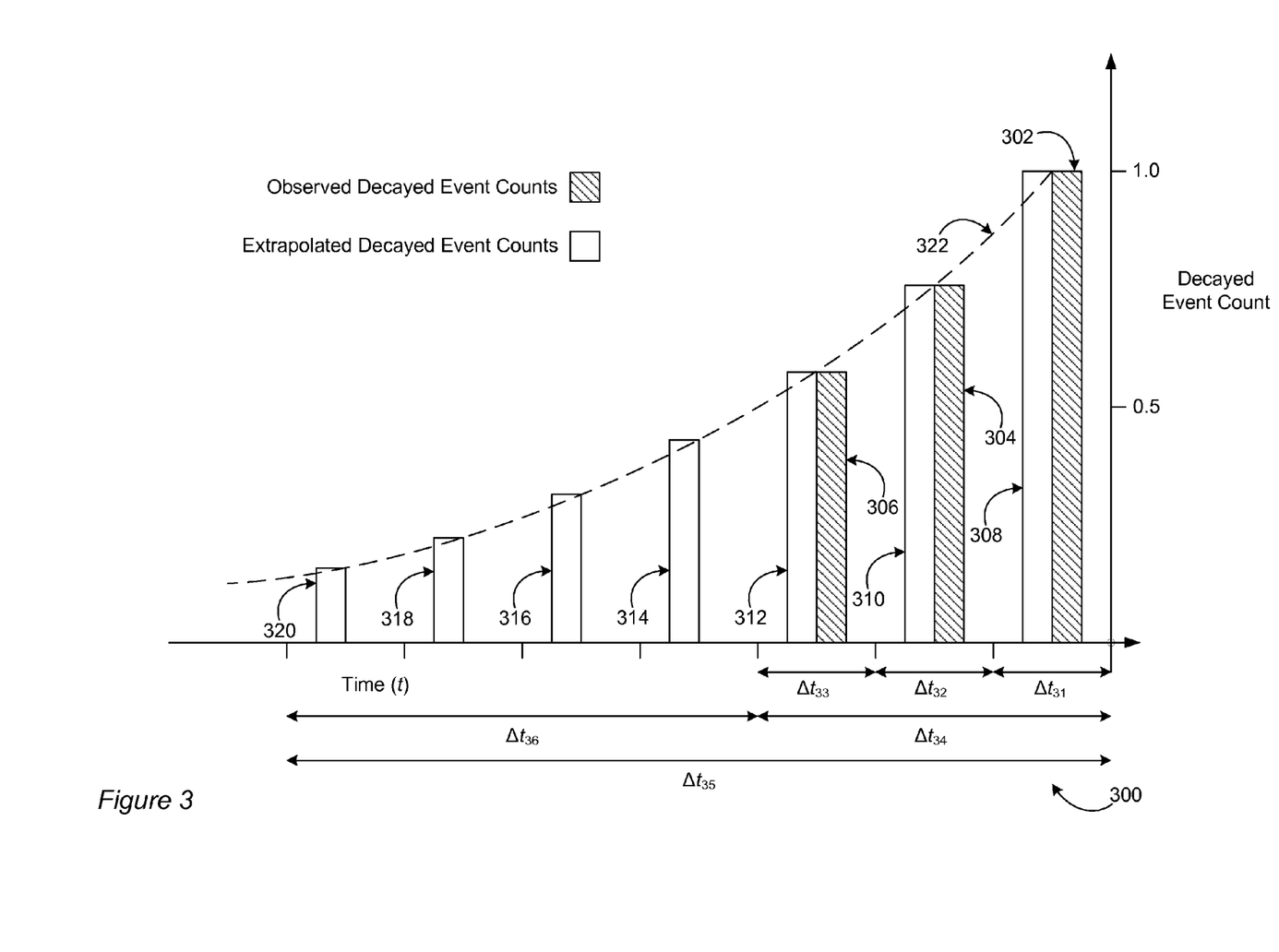
FIG. 3 is a graph depicting aspects of example observed decayed event counts and corresponding extrapolated decayed event counts in accordance with at least one embodiment.

In at least one embodiment, a set of history-dependent ranking components used by the search result ranking module 218 to determine ranking scores includes at least one ranking component based on decayed event counts. FIG. 3 shows a graph 300 depicting aspects of an example set of observed decayed event counts 302, 304, 306, and a corresponding set of extrapolated decayed event counts 308, 310, 312, 314, 316, 318, 320 in accordance with at least one embodiment. The observed decayed event counts 302, 304, 306 correspond to decayed counts of events occurring during periods of time (i.e., $\Delta t_{31}$, $\Delta t_{32}$, $\Delta t_{33}$, respectively) before an initial time for the set of data being analyzed (corresponding to the origin of the graph 300). For example, the decayed event counts 302, 304, 306 may correspond to counts of sales occurring during the time periods $\Delta t_{31}$, $\Delta t_{32}$, $\Delta t_{33}$ with respect to a particular content piece in the content collection 208. Raw (i.e., undecayed) event counts may be determined based on events recorded in the event history 212. An age of an event is an amount of time elapsed since an occurrence of the event and the initial time (e.g., the origin of the graph 300).

In the example depicted in FIG. 3, the decayed event counts 302, 304, 306 correspond to a same (undecayed) number of events occurring in each time period $\Delta t_{31}$, $\Delta t_{32}$, $\Delta t_{33}$, respectively. The decayed event counts 302, 304, 306 are decayed in accordance with a decay curve 322. For example, the decay curve 322 may be an exponential decay curve with respect to event age having a specified half-life (an "event count half-life"). In the example depicted in FIG. 3, the decayed event counts 302, 304, 306 are normalized with respect to the event count 302 occurring during the most recent time period $\Delta t_{31}$. In at least one embodiment, a ranking component is based on a sum of decayed event counts such as the decayed event counts 302, 304, 306. Further examples of ranking components in accordance with at least one embodiment include a moving average of decayed sales counts and/or relevance scores determined in accordance with U.S. patent application Ser. No. 12/045,470, titled "System and Method of Determining a Relevance Score," by Sewani et al., filed Mar. 10, 2008.

In the example depicted in FIG. 3, the decayed event counts 302, 304, 306 correspond to events occurring within a relatively short time period $\Delta t_{34}$ with respect to recent content. However, in at least one embodiment, decayed event counts corresponding to events occurring within a longer time period $\Delta t_{35}$ are required in order for the ranking component value based on the sum of the decayed event counts to be comparable to similar ranking component values for established content. For example, the time period $\Delta t_{35}$ may correspond to the establishment threshold for behavioral data history length.

The relatively short observed history summarized by decayed event counts 302, 304 and 306 may be extended, for example, throughout time period $\Delta t_{36}$, to provide a comparable behavioral data history. For example, decayed event counts 314, 316, 318, 320 in time period $\Delta t_{36}$ may be extrapolated from the decayed event counts 302, 304, 306 in time period $\Delta t_{34}$ in accordance with the decay curve 322. The decayed event counts 314, 316, 318, 320 may be extrapolated from the decayed event counts 302, 304, 306 in accordance with any suitable extrapolation technique. Such extrapolation may occur even when the observed history is partial, for example, if data corresponding to the decayed event count 304 were missing from the observed history. Suitable extrapolation techniques are well know to those of skill in the art and need not be described here in detail. Given an observed ranking component value based on decayed event counts 302, 304, 306, the inverted decay transformation module 220 (FIG. 2) may be configured to apply an inverted decay transformation that generates transformed ranking component values based on decayed event counts 302, 304, 306, 314, 316, 318 and 320.

Figure 4:
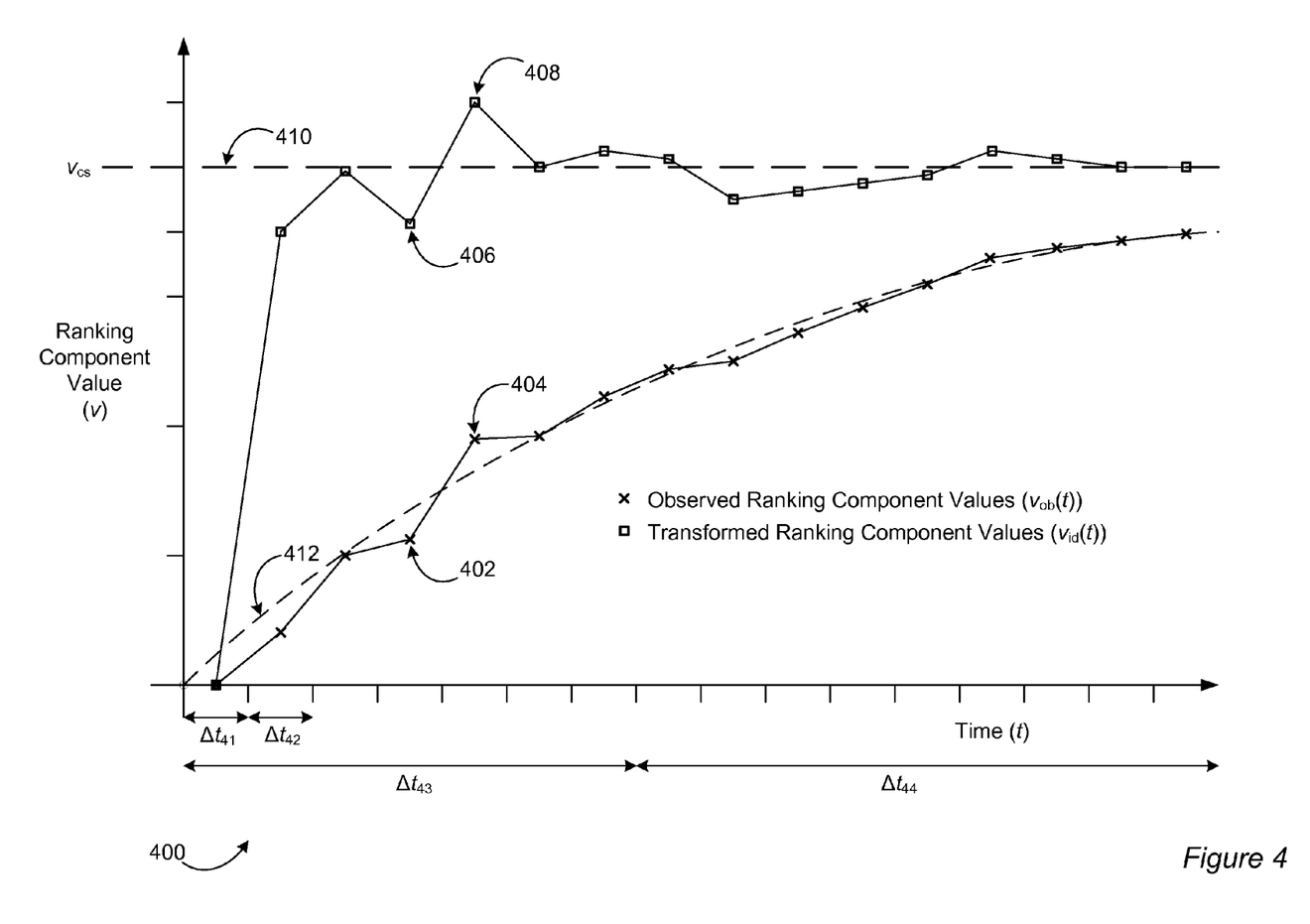
FIG. 4 is a graph depicting aspects of example observed ranking component values and corresponding transformed ranking component values in accordance with at least one embodiment.

As content in the content collection 208 (FIG. 2) becomes "less recent," associated inverted decay transformations may be designed to have a diminishing effect. FIG. 4 shows a graph 400 of example observed ranking component values for recent content (e.g., ranking component values 402 and 404) and corresponding adjusted ranking component values (e.g., ranking component values 406 and 408, respectively) in accordance with at least one embodiment. The example ranking component values for recent content 402, 404 are part of an example time series of observed ranking component values for recent content ($v_{ob}(t)$) depicted with 'x' marks in FIG. 4. The example time series begins with a zero value in a first time period ($\Delta t_{41}$), and rises to nonzero values in a second and subsequent time periods (e.g., $\Delta t_{42}$). In the graph 400, the origin of the time axis corresponds to a date and time at which the recent content was added to the content collection 208 (i.e., to the "add date" of the recent content), and points to the right of the origin on the time axis correspond to amounts of time that the (less and less) recent content has resided in the content collection 208, during which associated behavioral data history may be accumulated.

In at least one embodiment, the observed ranking component values $v_{ob}(t)$ for recent content approach a "comparable state" ranking component value ($v_{cs}$) 410. Although FIG. 4 depicts the comparable state ranking component value $v_{cs}$ as constant over time, each embodiment is not so limited. For example, the comparable state ranking component value $v_{cs}$ may correspond to any suitable ranking component value based on a comparable behavioral data history.

In at least one embodiment, the observed ranking component values $v_{ob}(t)$ for recent content approach the comparable state ranking component value $v_{cs}$ in accordance with a curve 412 based on a sum of decayed event counts such as the decayed event counts 302, 304, 306 of FIG. 3. For example, the observed ranking component values $v_{ob}(t)$ for recent content may be modeled with the formula:

$$v_{est}(t) = v_{cs}(1 - \exp(-Kt))$$

where exp( ) is the conventional exponential function, t is an age of the recent content in the content collection 208 (FIG. 2), K is a constant, $v_{cs}$ is the comparable state ranking component value 410, and $v_{est}(t)$ is an estimate of the ranking component value that will be observed at time t, i.e., an estimate of $v_{ob}(t)$. The constant K may be set based on observed ranking component values $v_{ob}(t)$ for the recent content and/or corresponding ranking component values, for example, corresponding ranking component values for content in a same and/or similar category as the recent content. When the event counts are decayed in accordance with one or more exponential decays, the constant K may be set based on one or more half-lives, for example, one or more half-lives associated with the one or more exponential decays.

The factor $(1-\exp(-Kt))$ in the above formula may be understood as corresponding to a ratio of an observed ranking component value for recent content to an estimate of the value that the ranking component would have if based on a comparable behavioral data history. For example, the observed ranking component value $v_{ob}(t)$ for a particular time period t may be determined using the formula $$v_{ob}(t) = \int_0^t \exp(-Kx)d = \frac{1}{K} - \frac{\exp(-Kt)}{K}$$

and the comparable state ranking component value $v_{cs}$ for the observed ranking component value $v_{ob}(t)$ may be determined using the formula $$v_{cs} = \int_0^\infty \exp(-Kx)dx = \frac{1}{K}.$$

Then, for this example:

$$\frac{v_{ob}(t)}{v_{cs}} = 1 - \exp(-Kt).$$

As described above with reference to FIG. 3, one or more inverted decay transformations may be applied to observed ranking component values $v_{ob}(t)$ for recent content to create transformed ranking component values $v_{id}(t)$. In FIG. 4, the transformed ranking component values $v_{id}(t)$, such as the ranking component values 406 and 408, are depicted with square '□' marks. The inverted decay transformation may adjust and/or scale at least some earlier observed ranking component values more than at least some later observed ranking component values. For example, the inverted decay transformation may adjust and/or scale nonzero observed ranking component values $v_{ob}(t)$ for content having an age in the content collection 208 (FIG. 2) within an earlier time period (e.g., $\Delta t_{43}$) more than observed ranking component values $v_{ob}(t)$ for content having an age within a later time period (e.g., $\Delta t_{44}$).

In at least one embodiment, the inverted decay transformation may be based on the curve 412 and/or a model thereof. For example, the inverted decay transformation may adjust and/or scale values of the model of the curve 412 to correspond to comparable state ranking component values $v_{cs}$, providing for same or similar results when applied to observed ranking component values $v_{ob}(t)$. Continuing the above example referencing a particular formula, the inverted decay transformation may be applied to the observed ranking component values $v_{ob}(t)$ as follows:

$$v_{id}(t) = v_{ob}(t)/(1 - \exp(-Kt))$$

where $v_{ob}(t)$ is the observed ranking component value associated with a particular age (t) in the content collection 208 of FIG. 2 (e.g., the current age), the '/' symbol has its usual meaning that $v_{ob}(t)$ is divided by the indicated factor, and $v_{id}(t)$ is the corresponding adjusted ranking component value. As in this example, the inverted decay transformation may correspond to scaling by a factor that decays over time to unity.

As another example, suppose that the observed ranking component values for recent content $v_{ob}(t)$ may be modeled with the formula:

$$v_{est}(t) = v_{cs}\min(Kt,w)/w$$

where min( ) is the conventional minimum function returning the minimum of its arguments, t is the age of the recent content in the content collection 208 (FIG. 2), K is again a constant (likely having a different value than the previous example), and w is a width of a smoothing window such as a time window for which a moving average is determined (e.g., 100 days). Then an inverted decay transformation based on the model may transform an observed ranking component value $v_{ob}(t)$ for a particular age t as follows:

$$v_{id}(t) = v_{ob}(t)w/\min(Kt,w)$$

where $v_{id}(t)$ is the corresponding transformed ranking component value. As in this example, the inverted decay transformation may correspond to scaling by a factor that decays to unity within a specified amount of time (within w/K units of time in this example).

Figure 5:
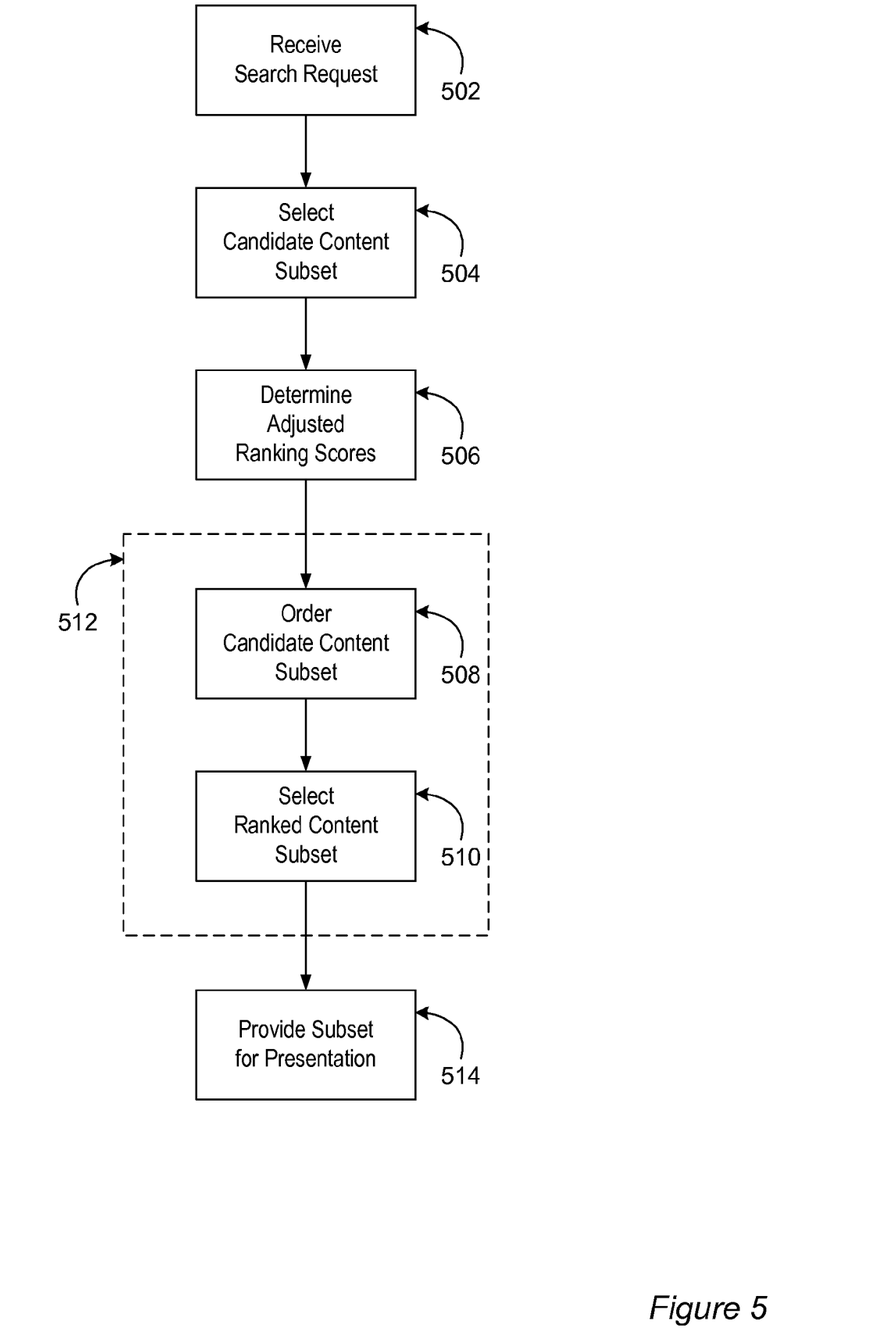
FIG. 5 is a flowchart depicting example steps for searching a content collection in accordance with at least one embodiment.

The description now turns to example steps that may be performed in accordance with at least one embodiment. FIG. 5 depicts example steps for facilitating search in accordance with at least one embodiment. At step 502, a search request may be received. For example, the search module 206 of FIG. 2 may receive the search request from the client device 102 of FIG. 1. A user of the client device 102 may submit the search request to the search module 206 by interacting with a user interface provided by the search UI module 222. At step 504, a candidate subset of the content collection 208 (FIG. 2) may be selected with respect to the search request. For example, the search module 206 may select the candidate subset of the content collection 208 based on the search request. The search module 206 may utilize the search index 210 to select the candidate subset. Relevance may play a screening and/or filtering role at step 504. Alternatively, the candidate subset may be selected independent of relevance scores.

At step 506, one or more adjusted ranking scores may be determined. For example, the search result ranking module 218 (FIG. 2) may determine an adjusted ranking score for each content piece in the candidate subset of the content collection 208 selected at step 504. In at least one embodiment, inverted decay transformations may be applied to suitable ranking components as part of step 506. However, each embodiment is not so limited. Inverted decay transformations may be applied to ranking components at any suitable time. For example, inverted decay transformations may be applied to ranking components at a time before the occurrence of step 502 and/or during a ranking component 216 build phase facilitated by the ranking component maintenance module 204. Example steps for determining adjusted ranking scores in accordance with at least one embodiment are described in more detail below with reference to FIG. 6.

At step 508, the candidate subset of the content collection 208 (FIG. 2) may be ordered. For example, the search result ranking module 218 may order the candidate subset of the content collection 208 in accordance with the adjusted ranking scores determined at step 506. At step 510, a ranked subset of the content collection 208 may be selected. For example, the search module 206 may select content for the ranked subset from the candidate subset selected at step 504. The search module 206 may select content for the ranked subset based on the ordering determined at step 508. For example, the search module 206 may select, for the ranked subset, content from the candidate subset having an adjusted ranking score meeting or exceeding a ranking threshold.

The dashed line 512 in FIG. 5 indicates that steps 508 and 510 may be integral. For example, the search module 206 (FIG. 2) may build the ranked subset by identifying and selecting content in the candidate subset of the content collection 208 having a greatest ranking score and then repeatedly selecting content in the candidate subset having a next greatest ranking score until the ranked subset exceeds a size threshold. At step 514, the ranked subset, and/or a representation thereof, may be provided for presentation. For example, the search UI module 222 may specify a presentation of at least a portion of the ranked subset and provide the presentation and/or its specification to the client device 102 of FIG. 1.

Figure 6:
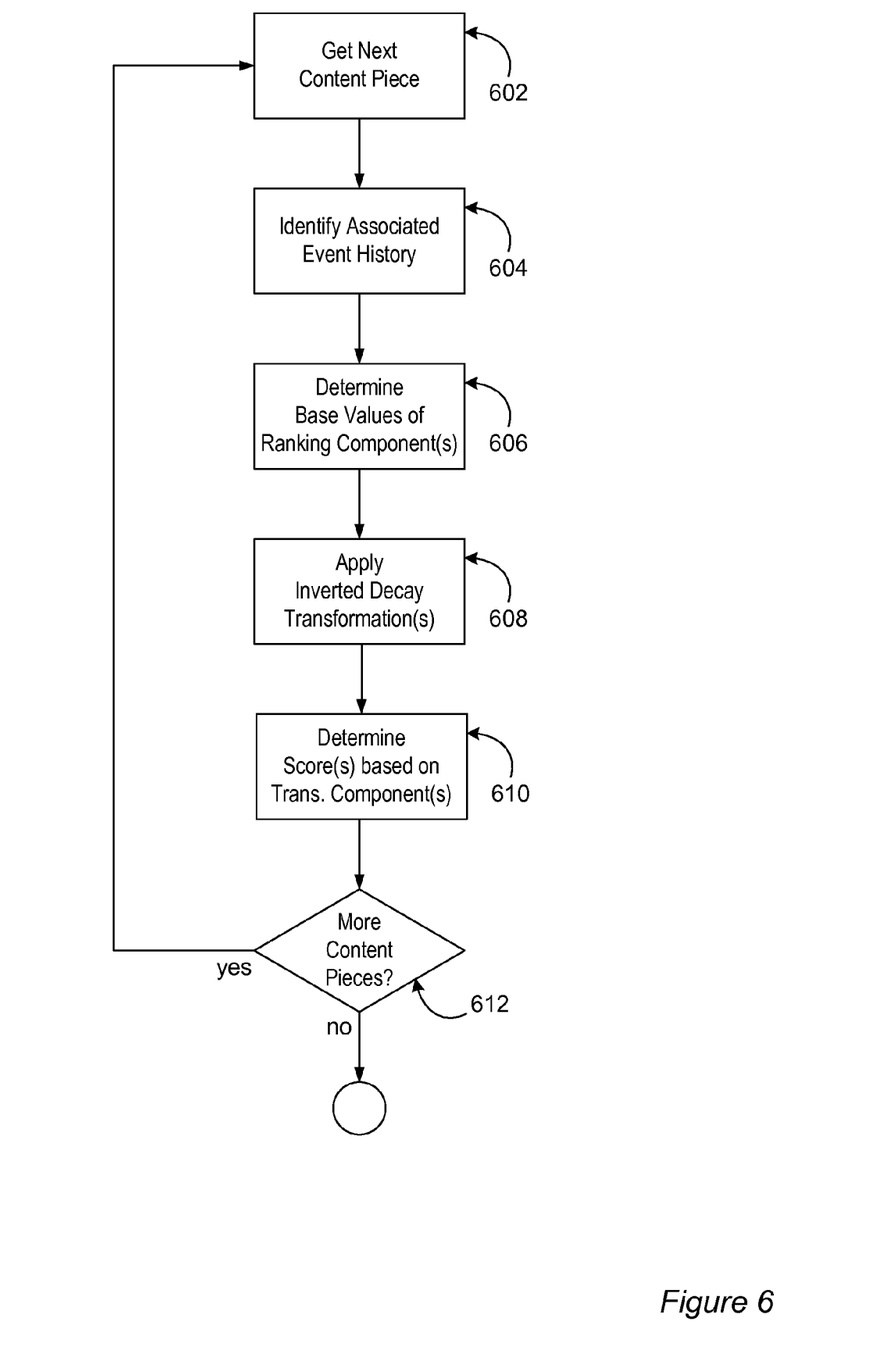
FIG. 6 is a flowchart depicting example steps for determining adjusted ranking scores in accordance with at least one embodiment.

The description now turns to FIG. 6. FIG. 6 depicts example steps for determining adjusted ranking scores in accordance with at least one embodiment. For example, one or more of the steps of FIG. 6 may be performed as part of step 506 of FIG. 5. Alternatively, or in addition, the steps of FIG. 6 during the ranking component build phase as described above with reference to FIG. 2. At step 602, a next (e.g., a first) piece of content ("content piece") may be selected. For example, the search result ranking module 218 (FIG. 2) may select the next content piece in the candidate subset of content collection 208 (e.g., the candidate subset of step 504). At step 604, an associated event history may be identified. For example, the search result ranking module 218 may identify a portion of the event history 212 associated with the selected content piece.

At step 606, base values (i.e., unadjusted values) of one or more ranking components may be determined. For example, the search result ranking module 218 of FIG. 2 may determine the ranking component base value(s) based on the associated event history identified at step 604. With reference to the examples of FIG. 3 and FIG. 4, ranking component base value 402 may be determined as a sum of decayed event counts 302, 304 and 306. In at least one embodiment, determining a particular ranking component base value includes summing each event count decayed with respect to multiple half-lives. For example, a ranking component corresponding to content views resulting from searches may be a sum having terms including each count decayed with a 7 day half-life and each count decayed with a 100 day half-life.

At step 608, one or more inverted decay transformations may be applied to the ranking component base value(s) determined at step 606. For example, the inverted decay transformation module 220 of FIG. 2 may select and apply suitable inverted decay transformations to the ranking component base value(s). With reference to the example of FIG. 4, the inverted decay transformation module 220 may determine the constant K for the observed ranking component values $v_{ob}(t)$ associated with the selected content piece (the ranking component base value(s) determined at step 606 being the latest in this observed value time series), for example, by utilizing a suitable curve fitting technique. The inverted decay transformation module 220 may then apply the inverted decay transformation to the ranking component base value(s) determined at step 606 with the formula $v_{id}(t)=v_{ob}(t)/(1-\exp(-Kt))$. Alternatively, the constant K may be determined with respect to a category into which the selected content piece has been categorized. For example, the constant K may be determined based on a suitable statistical combination of the observed ranking component values $v_{ob}(t)$ associated with content in the category. As further alternatives, the inverted decay constant K may be determined for the content collection 208 as a whole, set manually, and with suitable combinations of the alternatives.

At step 610, one or more adjusted ranking scores may be determined. For example, the search result ranking module 218 of FIG. 2 may determine the adjusted ranking score(s) based at least in part on the ranking component(s) transformed at step 608. Ranking scores in accordance with at least one embodiment may be linear or non-linear combinations of a set of ranking components including ranking components such as those determined at step 606 and adjusted ranking components such as those transformed at step 608.

At step 612, it may be determined whether there are more content pieces for which to determine adjusted ranking scores. If so, a procedure incorporating step 612 may progress to step 602. Otherwise, the procedure may progress to one or more steps not shown in FIG. 6 such as step 508 of FIG. 5.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for searching a content collection, comprising:
    under control of one or more computer systems configured with executable instructions,
        receiving a search request and responsively selecting a candidate subset of the content collection based at least in part on the search request;
        identifying a recent content event history associated with at least one content piece of the candidate subset;
        determining a set of ranking components including an observed ranking component based on the recent content event history;
        determining a set of ranking scores for content in the candidate subset of the content collection based at least in part on the set of ranking components;
        applying an inverted decay transformation to the observed ranking component to yield a transformed ranking component, wherein applying the inverted decay transformation corresponds to simulating an extended behavioral data history of the at least one content piece;
        adjusting at least one of the ranking scores of the set of ranking scores based on the transformed ranking component to yield an adjusted ranking score; and
        providing for presentation at least a reference to content in a ranked subset of the candidate subset of the content collection, the ranked subset ordered based at least in part on the set of ranking scores that includes the adjusted ranking score.

2. A computer-implemented method for searching a content collection, comprising:
    under control of one or more computer systems configured with executable instructions,
        receiving a search request and responsively selecting a candidate subset of the content collection;
        identifying a recent content event history associated with at least one content piece of the candidate subset;
        applying an inverted decay transformation to a ranking component of a respective one of the at least one content piece, the ranking component based at least in part on the recent content event history associated with the respective one of the at least one content piece, the inverted decay transformation corresponding to simulating an extended behavioral data history of the respective one of the at least one content piece;
        determining a set of ranking scores for the candidate subset of the content collection;
        adjusting at least one ranking score of the set of ranking scores based at least in part on the ranking component applied with the inverted decay transformation to yield an adjusted ranking score; and
        providing for presentation at least a reference to content in a ranked subset of the content collection selected based at least in part on the set of ranking scores that includes the adjusted ranking score.

3. A computer-implemented method according to claim 2, wherein the application of the inverted decay transformation is responsive to the search request.

4. A computer-implemented method for searching a content collection, comprising:
    under control of one or more computer systems configured with executable instructions,
        identifying recent event history associated with at least one content piece of the content collection;
        determining a set of ranking components, based at least in part on the recent event history, for the content collection;
        applying at least one inverted decay transformation to at least one ranking component, from the set of ranking components, associated with a respective content piece of the content collection, wherein the at least one inverted decay transformation corresponds to simulating an extended behavioral data history of the respective content piece based on the recent event history of the respective content piece;
        determining at least one ranking score for at least a first subset of the content collection based at least in part on said at least one ranking component applied with the at least one inverted decay transformation; and
        providing for presentation at least a reference to content in a second subset of the content collection selected based at least in part on said at least one ranking score.

5. A computer-implemented method according to claim 4, wherein said at least one inverted decay transformation adjusts first ranking components more than second ranking components determined based on longer content event histories.

6. A computer-implemented method according to claim 4, wherein:
    said at least one inverted decay transformation further corresponds to simulating additional content event history with respect to said recent content event history.

7. A computer-implemented method according to claim 6, wherein said at least one ranking component is based at least in part on event counts decayed according to their age in said recent content event history associated with the respective content piece.

8. A computer-implemented method according to claim 6, further comprising identifying at least one established content event history of the content collection; and
    wherein:
        determining said set of ranking components is based at least in part on event counts associated with the content collection that are decayed according to their age in said at least one established content event history; and
        applying said at least one inverted decay transformation to said at least one ranking component further corresponds to simulating additional event counts decayed according to their age in the additional content event history.

9. A computer-implemented method according to claim 8, wherein the event counts are decayed in accordance with at least one exponential decay having at least one event count half-life.

10. A computer-implemented method according to claim 9, wherein applying said at least one inverted decay transformation comprises scaling said at least one ranking component by an inverted decay factor based at least in part on the at least one exponential decay.

11. A computer-implemented method according to claim 10, wherein the at least one exponential decay of the inverted decay factor has a half-life based at least in part on said at least one event count half-life.

12. A computer-implemented method according to claim 8, wherein the event counts comprise a count of transactions associated with the content in the first subset of the content collection.

13. A computer-implemented method according to claim 12, wherein said at least one ranking component is based at least in part on a moving average of decayed sales counts.

14. A computer-implemented method according to claim 4, wherein:
said at least one inverted decay transformation comprises multiplying said at least one ranking component by a factor that decays to unity as said recent content event history becomes longer.

15. A computer-implemented method according to claim 14, wherein the factor decays to unity over a specified time period.

16. A computer-implemented method according to claim 15, wherein said recent content event history is shorter than the specified time period.

17. A computer-implemented method according to claim 4, wherein:
determining said set of ranking components is further based at least in part on at least one established content event history associated with said at least one content piece of the content collection; and
applying said at least one inverted decay transformation to said at least one ranking component further corresponds to simulating additional content event history based at least in part on said at least one established content event history.

18. A computer-implemented method according to claim 4, wherein providing for presentation is responsive to a search request comprising at least one keyword.

19. A computer-implemented method according to claim 4, wherein providing for presentation is responsive to a search request comprising at least one non-keyword search constraint.

20. A computerized system for searching a content collection, comprising:
a search module configured to, at least:
identify a recent content event history associated with at least one content piece of the content collection;
determine a set of ranking components for the content collection, the set of ranking components including an observed ranking component based on the recent content event history;
determine at least one ranking score for the content collection, the at least one ranking score based at least upon the set of ranking components;
apply an inverted decay transformation to the observed ranking component associated with a respective content piece of the content collection to yield a transformed ranking component, wherein applying the inverted decay transformation corresponds to simulating an extended behavioral data history of the respective content piece;
adjust the at least one ranking score based on the transformed ranking component to yield an adjusted ranking score;
provide for presentation at least a reference to content in a subset of the content collection selected based at least in part on said at least one ranking score including the adjusted ranking score; and
at least one processor collectively facilitating at least the search module.

21. A computerized system according to claim 20, wherein:
the computerized system further comprises a data store storing at least one event established history for each content piece in the content collection; and
at least one of the set of ranking components is based at least in part on said at least one established event history.

22. A computerized system according to claim 21, wherein the data store further stores said at least one of the set of ranking components, and said at least one of the set of ranking components is periodically updated independent of the search module.

23. One or more non-transitory computer-readable media having collectively thereon computer-executable instructions that configure one or more computers to collectively, at least:
identify a recent content event history associated with at least one content piece of the content collection;
determine a set of ranking components for the content collection, the set of ranking components including an observed ranking component based on the recent content event history;
determine a set of ranking scores for a first subset of the content collection, the set of ranking scores based at least in part on the set of ranking components;
apply a set of inverted decay transformations to the observed ranking component of a respective content piece of the content collection to simulate an extended behavioral data history of the respective content piece;
adjust one of the ranking scores of the set of ranking scores based at least in part on the observed ranking component applied with the set of inverted decay transformations to yield an adjusted ranking score; and
provide a presentation of content in a second subset of the content collection, the second subset of the content collection selected based at least in part on the set of ranking scores including the adjusted ranking score.

24. One or more non-transitory computer-readable media according to claim 23, wherein selecting the second subset of the content collection comprises:
ordering the first subset of the content collection in accordance with the set of ranking scores including the adjusted ranking score; and
selecting, in an order of the first subset, a threshold number of content pieces from the first subset for the second subset.

25. The computer-implemented method of claim 1, wherein applying the inverted decay transformation to the observed ranking component comprises:
determining a constant value for the observed ranking component; and
applying an inverted decay formula based on the constant value to the observed ranking component.

* * * * *